United States Patent
Mirjafari et al.

(10) Patent No.: US 10,224,816 B2
(45) Date of Patent: Mar. 5, 2019

(54) INDIVIDUAL PHASE TEMPERATURE MONITORING AND BALANCE CONTROL FOR SMART POWER STAGE-BASED VOLTAGE REGULATOR

(71) Applicant: Dell Products L.P., Round Rock, TX (US)

(72) Inventors: Mehran Mirjafari, Austin, TX (US); Shiguo Luo, Austin, TX (US); Lei Wang, Austin, TX (US); Guangyong Zhu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 15/461,137

(22) Filed: Mar. 16, 2017

(65) Prior Publication Data
US 2018/0269786 A1    Sep. 20, 2018

(51) Int. Cl.
*H02M 3/158*    (2006.01)
*H02M 1/32*    (2007.01)

(52) U.S. Cl.
CPC .......... *H02M 3/1584* (2013.01); *H02M 1/32* (2013.01); *H02M 2001/327* (2013.01)

(58) Field of Classification Search
CPC . H02M 1/32; H02M 2001/327; H02M 3/1584
See application file for complete search history.

(56) References Cited

U.S. PATENT DOCUMENTS

| | | | |
|---|---|---|---|
| 6,189,107 B1 | 2/2001 | Kim et al. | |
| 8,742,622 B2 | 6/2014 | Richards, III | |
| 9,000,786 B2 | 4/2015 | Luo et al. | |
| 9,529,765 B2* | 12/2016 | Henzler | G06F 13/4221 |
| 2002/0118001 A1* | 8/2002 | Duffy | H02J 1/102 323/283 |
| 2006/0149396 A1* | 7/2006 | Templeton | H02J 1/102 700/22 |
| 2011/0051479 A1* | 3/2011 | Breen | H02M 3/1584 363/148 |
| 2011/0099395 A1* | 4/2011 | Richards, III | G06F 1/26 713/310 |
| 2011/0226462 A1* | 9/2011 | Sato | G06F 1/206 165/247 |

(Continued)

*Primary Examiner* — Fred E Finch, III
(74) *Attorney, Agent, or Firm* — Baker Botts L.L.P.

(57) ABSTRACT

Systems and methods for individual phase temperature monitoring and balance control in a multi-phase voltage regulator may include a plurality of smart power stages including a first smart power stage and a second smart power stage and a voltage regulator controller. The voltage regulator controller may send a first control signal to the first smart power stage to enable the first smart power stage to send a first temperature of the first smart power stage to the voltage regulator controller during a first phase of a switching cycle. The voltage regulator controller may also determine that the first temperature received by the voltage regulator controller corresponds to the first smart power stage based on the first control signal. The voltage regulator controller may further send a second control signal to the second smart power stage to enable the second smart power stage to send a second temperature to the voltage regulator controller during a second phase.

8 Claims, 14 Drawing Sheets

(56) References Cited

U.S. PATENT DOCUMENTS

| | | | | |
|---|---|---|---|---|
| 2011/0234000 A1* | 9/2011 | Yan | H02M 3/157 | |
| | | | | 307/31 |
| 2012/0324246 A1* | 12/2012 | Rahardjo | G06F 1/26 | |
| | | | | 713/300 |
| 2013/0328400 A1* | 12/2013 | Barus | G06F 1/28 | |
| | | | | 307/43 |
| 2014/0232420 A1* | 8/2014 | Luo | G06F 1/26 | |
| | | | | 324/750.01 |
| 2014/0312857 A1* | 10/2014 | Zheng | H02M 1/32 | |
| | | | | 323/234 |
| 2015/0207400 A1* | 7/2015 | Shenoy | H02M 3/1584 | |
| | | | | 323/213 |
| 2015/0370295 A1* | 12/2015 | Luo | H02M 3/157 | |
| | | | | 713/330 |
| 2015/0370300 A1* | 12/2015 | Luo | G06F 1/28 | |
| | | | | 711/103 |
| 2018/0123454 A1* | 5/2018 | Symonds | H02M 3/156 | |

\* cited by examiner

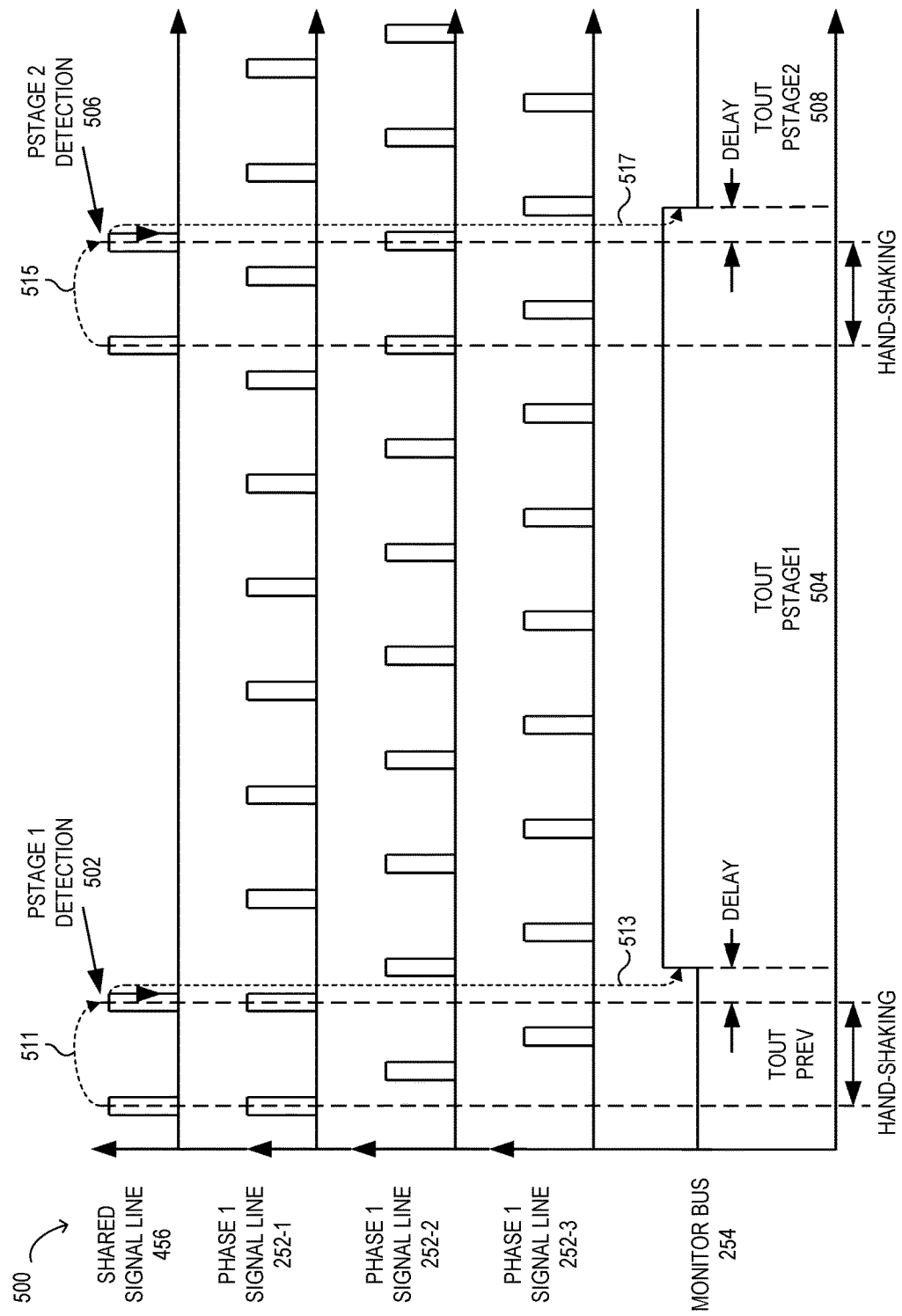

INDIVIDUAL PHASE TEMPERATURE MONITORING AND BALANCE CONTROL FOR SMART POWER STAGE-BASED VOLTAGE REGULATOR

BACKGROUND

Field of the Disclosure

This disclosure relates generally to information handling systems and, more particularly, to a multi-phase voltage regulator for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include a variety of hardware and/or software components that may be configured to process, store, and/or communicate information. Information handling systems may also include one or more multi-phase voltage regulators to ensure that necessary electrical current is consistently supplied to one or more devices in the information handling system. Typical multi-phase voltage regulators may include a voltage regulator controller and multiple power stages, each power stage may include a temperature output/fault pin (TOUT/FLT) that may allow for temperature monitoring and fault detection of the power stage. In the typical multi-phase voltage regulator, the voltage regulator controller has only a single temperature monitor pin (TMON) that connects the voltage regulator controller to the multiple power stages via a shared monitor bus. In this configuration, each TOUT/FLT of each individual power stage is wire-ored to the shared monitor bus, which results in the individual power stage that has the highest temperature to dominate the bus with the highest temperature. The voltage regulator controller may not have the knowledge of the temperatures of each of the other individual power stages or which individual power stage has this highest temperature. In addition, when an individual power stage signals a fault on its TOUT/FLT on the monitor bus, the voltage regulator controller only knows that one or more of the multiple power stage is signaling a fault but it does not know which one. In a voltage regulator protection scheme, the voltage regulator controller may shutdown all of the power stages, causing a power disruption and potential loss of data. This may prevent the voltage regulator controller from monitoring the temperate or detecting any faults for an individual power stage.

SUMMARY

In one aspect, a disclosed multi-phase voltage regulator may include a plurality of smart power stages including a first smart power stage and a second smart power stage. The multi-phase voltage regulator may also include a controller coupled to: the first smart power stage by a first signal line and a shared monitor bus, and the second smart power stage by a second signal line and the shared monitor bus. The voltage regulator controller may send a first control signal to the first smart power stage via the first signal line to enable the first smart power stage to send a first temperature of the first smart power stage to the voltage regulator controller during a first phase of a switching cycle corresponding to the first smart power stage. The voltage regulator controller may also determine that the first temperature received by the voltage regulator controller via the shared monitor bus corresponds to the first smart power stage based on the first control signal. The voltage regulator controller may also send a second control signal to the second smart power stage via the second signal line to enable the second smart power stage to send a second temperature to the voltage regulator controller during a second phase.

In any of the disclosed embodiments of the multi-phase voltage regulator, the voltage regulator controller may determine that the second temperature received by the voltage regulator controller corresponds to the second smart power stage based on the second control signal.

In any of the disclosed embodiments of the multi-phase voltage regulator, the first smart power stage may include a first switch to send the first temperature to the voltage regulator controller based on a rising edge of the first control signal.

In any of the disclosed embodiments of the multi-phase voltage regulator, the first switch may be controlled by a mono-stable multi-vibrator.

In any of the disclosed embodiments of the multi-phase voltage regulator, the voltage regulator controller may determine whether the first temperature of the first smart power stage is equal to or greater than a value of a temperature imbalance threshold. The voltage regulator controller may also, when the first temperature is equal to or greater than the value of the temperature imbalance threshold, reduce a first duty cycle of the first phase and adjust each duty cycle of each of the plurality of the other phases according to a temperature balance control policy.

In any of the disclosed embodiments of the multi-phase voltage regulator, the value of the temperature imbalance threshold may include an average of each temperature of each smart power stage of the plurality of smart power stages.

In any of the disclosed embodiments of the multi-phase voltage regulator, the voltage regulator controller may determine whether the first temperature of the first smart power stage is equal to or greater than a value of a temperature imbalance threshold. The voltage regulator controller may also, when the first temperature is equal to or greater than the value of the temperature imbalance threshold, send a warning that indicates an imminent fault of the first smart power stage.

In any of the disclosed embodiments of the multi-phase voltage regulator, the first control signal may be a pulse width modulated signal.

In another aspect, a disclosed multi-phase voltage regulator may include a plurality of smart power stages including a first smart power stage and a second smart power stage. The multi-phase voltage regulator may also include a voltage regulator controller coupled to: the first smart power stage by a first signal line, a shared signal line, and a shared monitor bus, and the second smart power stage by a second signal line, the shared signal line, and the shared monitor bus. The voltage regulator controller may send a first sequence of one or more control signals to the first smart power stage via the first signal line. The voltage regulator controller may also send a second sequence of one or more shared control signals that coincide with the first sequence of one or more control signals to the plurality of smart power stages via the shared signal line to enable the first smart power stage to send a first temperature of the first smart power stage to the voltage regulator controller during a first reporting window. The voltage regulator controller may further determine that the first temperature received by the voltage regulator controller via the shared monitor bus corresponds to the first smart power stage based on the second sequence of the one or more shared control signals. The voltage regulator controller may also send a fourth sequence of one or more shared control signals that coincide with a third sequence of one or more control signals to the plurality of smart power stages via the shared signal line to enable the second smart power stage to send a second temperature of the second smart power stage to the voltage regulator controller during a second reporting window.

In any of the disclosed embodiments of the multi-phase voltage regulator, the voltage regulator controller may determine that the second temperature corresponds to the second smart power stage based on the fourth sequence of the one or more shared control signals.

In any of the disclosed embodiments of the multi-phase voltage regulator, the first smart power stage may include a detector to send the first temperature to the voltage regulator controller based on detection of the second sequence of the one or more shared control signals that coincide with the first sequence of the one or more control signals received by the first smart power stage.

In any of the disclosed embodiments of the multi-phase voltage regulator, the voltage regulator controller may determine whether the first temperature of the first smart power stage is equal to or greater than a value of a temperature imbalance threshold. The voltage regulator controller may also, when the first temperature is equal to or greater than the value of the temperature imbalance threshold, reduce a first duty cycle of the first phase and adjust each duty cycle of each of the plurality of the other phases according to a temperature balance control policy.

In any of the disclosed embodiments of the multi-phase voltage regulator, the value of the temperature imbalance threshold may include an average of each temperature of each smart power stage of the plurality of smart power stages.

In any of the disclosed embodiments of the multi-phase voltage regulator, the voltage regulator controller may determine whether the first temperature of the first smart power stage is equal to or greater than a value of a temperature imbalance threshold. The voltage regulator controller may also, when the first temperature is equal to or greater than the value of the temperature imbalance threshold, send a warning that indicates an imminent fault of the first smart power stage.

In any of the disclosed embodiments of the multi-phase voltage regulator, the first sequence of the one or more control signals may be pulse width modulated signals.

In yet another aspect, a disclosed multi-phase voltage regulator may include a plurality of smart power stages including a first smart power stage and a second smart power stage. The multi-phase voltage regulator may also include a voltage regulator controller coupled to: the first smart power stage by a shared signal line and a shared monitor bus, and the second smart power stage by the shared signal line and the shared monitor bus. The voltage regulator controller may send a first sequence of a first number of shared control signals to the plurality of smart power stages via the shared signal line to enable the first smart power stage corresponding to the first number to send a first temperature of the first smart power stage to the voltage regulator controller during a first reporting window. The voltage regulator controller may also determine that the first temperature received by the voltage regulator controller via the shared monitor bus corresponds to the first smart power stage based on the first sequence of the first number of shared control signals. The voltage regulator controller may further send a second sequence of a second number of shared control signals to the plurality of smart power stages via the shared signal line to enable the second smart power stage corresponding to the second number to send a second temperature of the second smart power stage to the voltage regulator controller during a second reporting window.

In any of the disclosed embodiments of the multi-phase voltage regulator, the voltage regulator controller may determine that the second temperature received by the voltage regulator controller via the shared monitor bus corresponds to the second smart power stage based on the second sequence of the second number of shared control signals.

In any of the disclosed embodiments of the multi-phase voltage regulator, the first smart power stage may include a detector to send the first temperature to the voltage regulator controller based on a count of each falling edge of the first sequence of the first number of shared control signals received from the voltage regulator controller matches the first number corresponding to the first smart power stage when a temperature request duration is reached.

In any of the disclosed embodiments of the multi-phase voltage regulator, the voltage regulator controller may determine whether the first temperature of the first smart power stage is equal to or greater than a value of a temperature imbalance threshold. The voltage regulator controller may, when the first temperature is equal to or greater than the value of the temperature imbalance threshold, reduce a first duty cycle of the first phase and adjust each duty cycle of each of the plurality of the other phases according to a temperature balance control policy.

In any of the disclosed embodiments of the multi-phase voltage regulator, the voltage regulator controller may determine whether the first temperature of the first smart power stage is equal to or greater than a value of a temperature imbalance threshold. The voltage regulator controller may also, when the first temperature is equal to or greater than the value of the temperature imbalance threshold, send a warning that indicates an imminent fault of the first smart power stage.

Other technical advantages will be apparent to those of ordinary skill in the art in view of the following specification, claims, and drawings.

BRIEF DESCRIPTION OF THE DRAWINGS

For a more complete understanding of the present invention and its features and advantages, reference is now made to the following description, taken in conjunction with the accompanying drawings, in which:

FIG. 5 is a timing diagram of shared signal line, phase signal line, and monitor bus signals for selected elements of an embodiment of a multi-phase voltage regulator having a shared signal line;

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, current information handling systems may demand multi-phase voltage regulators that are able to monitor the temperature and detect a fault of each individual smart power stage, while consistently supplying the necessary electrical current to the information handling systems and reducing their size. As will be described in further detail, the inventors of the present disclosure have developed novel circuits and methods disclosed herein for individual phase temperature monitoring and balance control for a smart power stage based voltage regulator.

Particular embodiments are best understood by reference to FIGS. 1 through 11 wherein like numbers are used to indicate like and corresponding parts.

Figure 1:
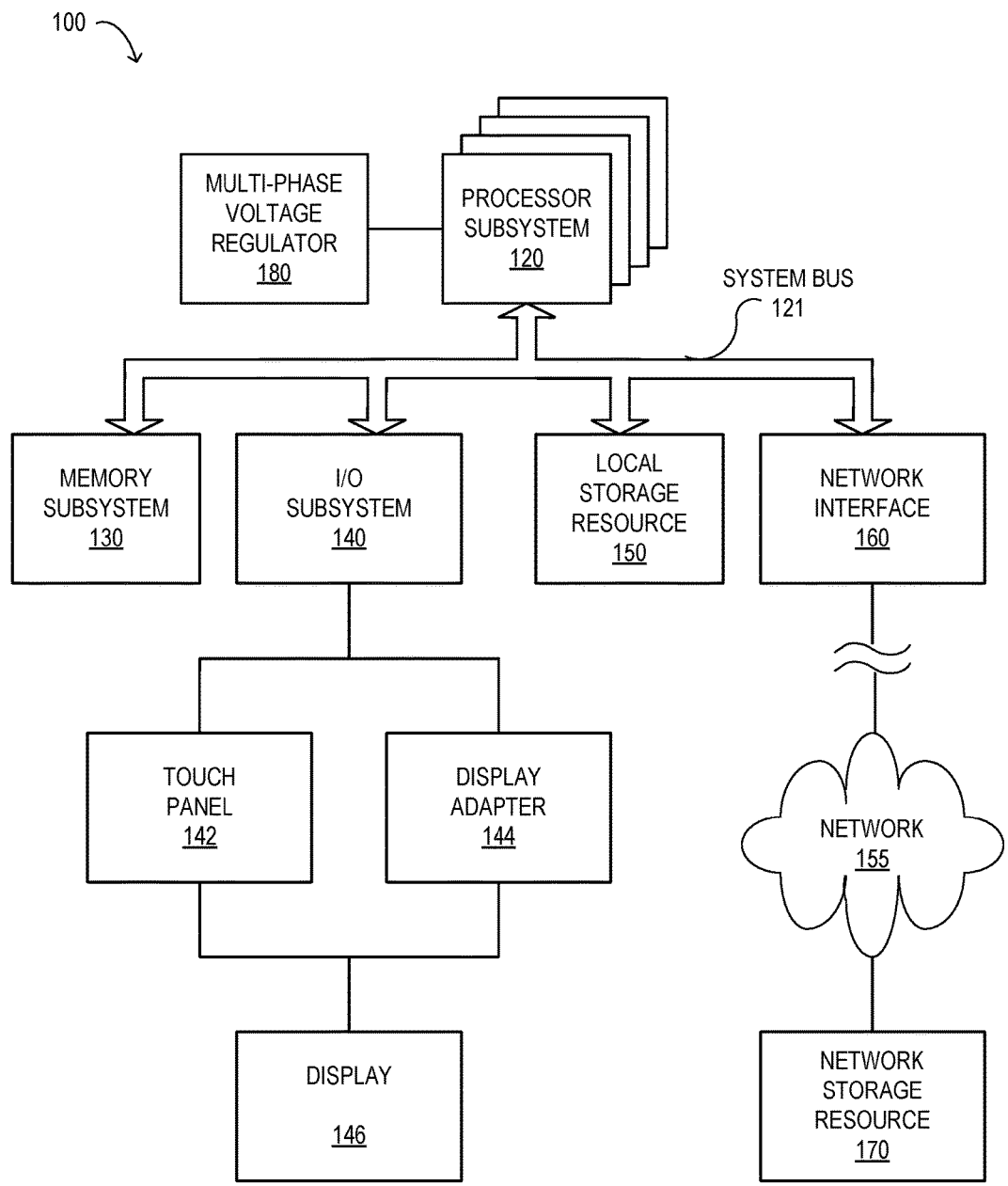
FIG. 1 is a block diagram of selected elements of an embodiment of an information handling system.

Turning now to the drawings, FIG. 1 illustrates a block diagram depicting selected elements of an embodiment of information handling system 100. As shown in FIG. 1, components of information handling system 100 may include, but are not limited to, a multi-phase voltage regulator 180, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to a network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/within system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display 146 that is driven by display adapter 144.

As will be described in further detail, information handling system 100, or certain components included therein, may be supplied power by one or more power supply units. The power supply units may supply current to processor subsystem 120, memory subsystem 130, I/O subsystem 140, local storage resource 150, among other components of information handling system 100. A power supply unit may utilize multi-phase voltage regulator 180 to ensure the necessary electrical current is consistently supplied to these components, as described in further detail below. As shown, multi-phase voltage regulator 180 is coupled to processor subsystem 120 but may be coupled to other components of information handling system 100.

Figure 2A:
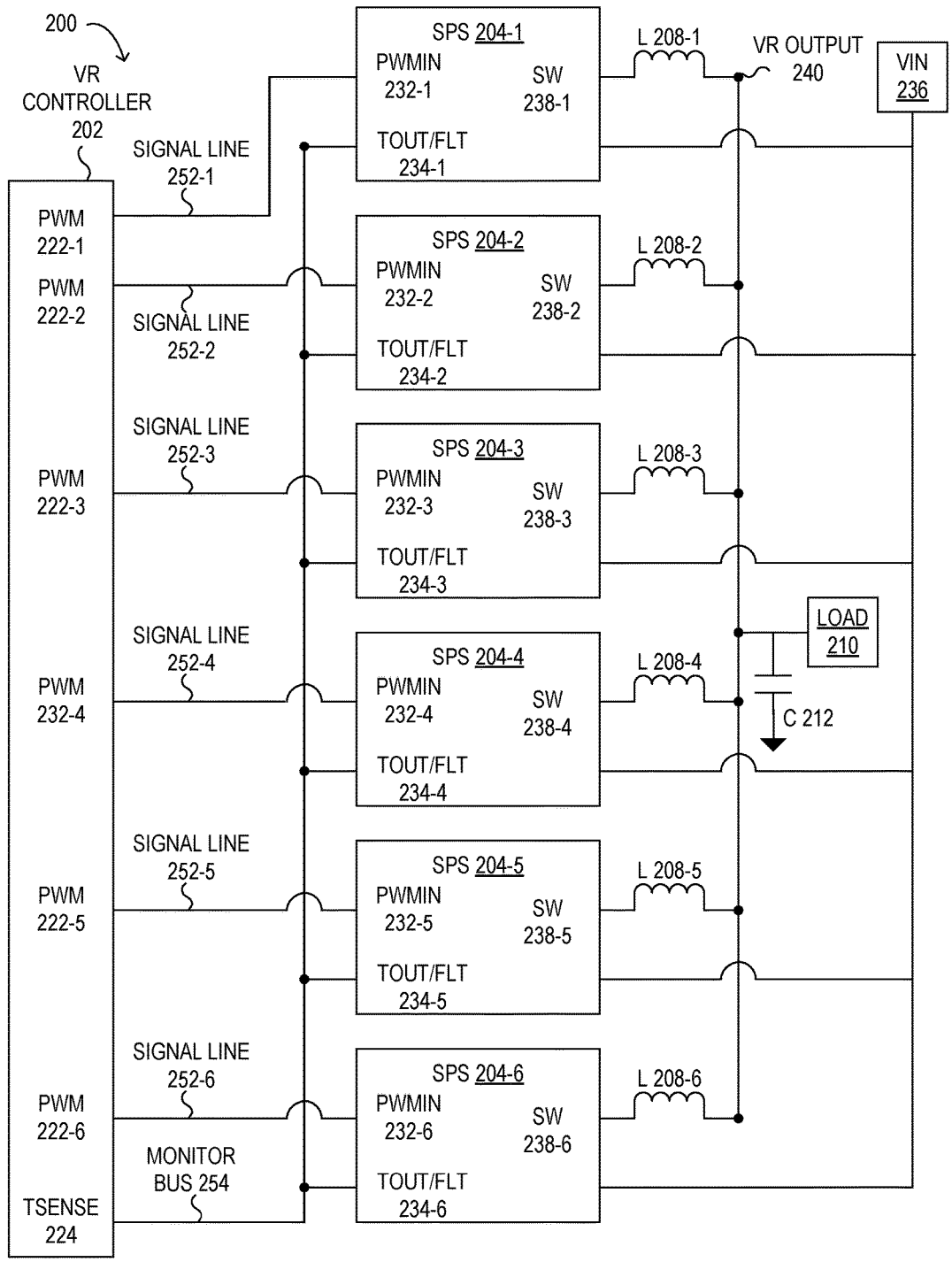
FIG. 2A is a circuit diagram of selected elements of an embodiment of a multi-phase voltage regulator.
Figure 2B:
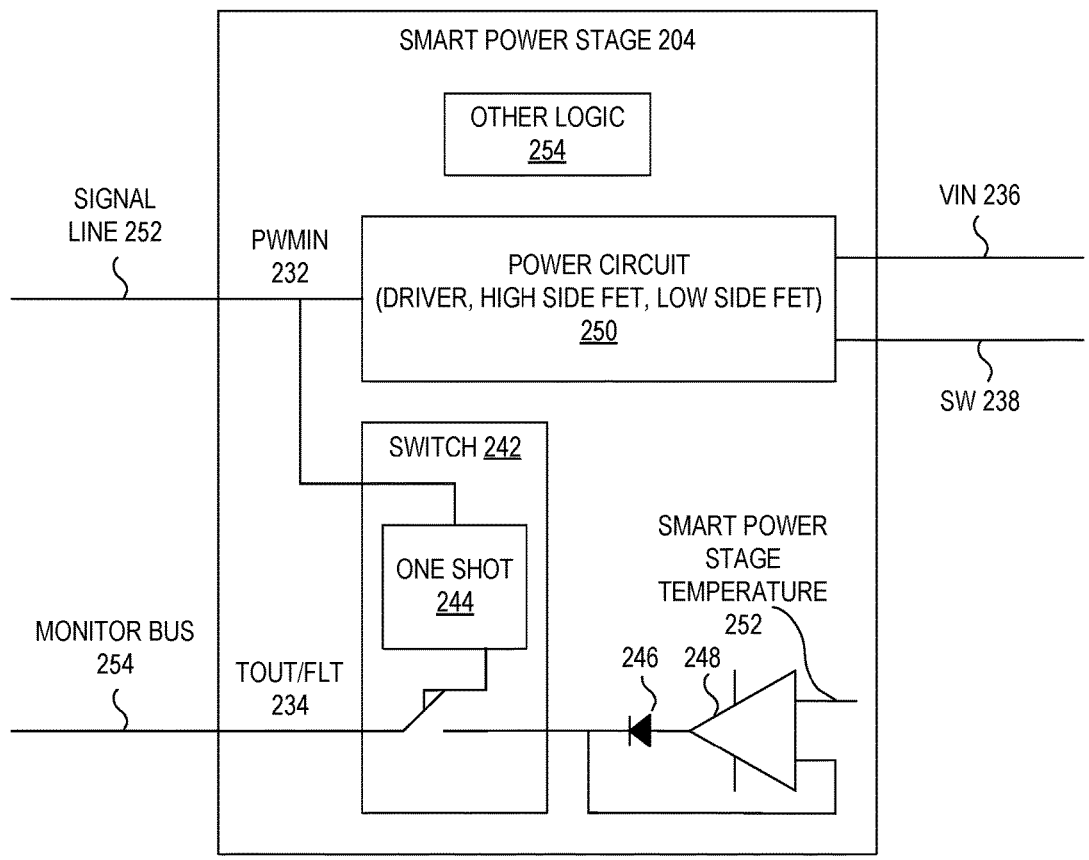
FIG. 2B is a circuit diagram of selected elements of an embodiment of a smart power stage of a multi-phase voltage regulator.

Turning now to FIGS. 2A and 2B, a circuit diagram of selected elements of an embodiment of a multi-phase voltage regulator 200 is illustrated. Multi-phase voltage regulator 200 may be multi-phase voltage regulator 180 described above. In FIGS. 2A and 2B, multi-phase voltage regulator 200 is shown in a schematic representation and is not drawn to scale or perspective. It is noted that, in different embodiments, multi-phase voltage regulator 200 may be operated with additional or fewer elements.

As shown in FIG. 2A, components of multi-phase voltage regulator 200 may include, but are not limited to, a voltage regulator controller 202, a plurality of smart power stages 204 including smart power stages 204-1 to 204-6, a voltage regulator input voltage (VIN) 236, inductors 208 including inductor 208-1 to 208-6, a voltage regulator output voltage 240, a load 210, and a capacitor 212. A plurality of signal lines 252 including signal lines 252-1 to 252-6 may be coupled between a plurality of corresponding pulse width modulation (PWM) outputs 222 including PWM outputs 222-1 to 222-6 of voltage regulator controller 202 and a plurality of corresponding PWM inputs 232 including PWM inputs 232-1 to 232-6 of smart power stages 204-1 to 204-6 respectively. For example, signal line 252-1 is coupled between PWM output 222-1 of voltage regulator controller 202 and PWM input 232-1 of smart power stage 204-1. Each signal line may be a PWM signal line and may carry a PWM control signal having a voltage at a high voltage level, a low voltage level, or a tristate voltage level. A monitor bus 254 is coupled between a temperature sense/fault pin (TSENSE) 224 of voltage regulator controller 202 and a plurality of corresponding temperature output/fault pins (TOUT/FLT) 234 including TOUT/FLT 234-1 to 234-6 of smart power stages 204-1 to 204-6. For example, monitor bus 254 is coupled between TSENSE 224 of voltage regulator controller 202 and TOUT/FLT 234-1 of smart power stage 204-1. Monitor bus 254 is also coupled between TSENSE 224 and TOUT/FLT 234-3 of smart power stage 204-3. In this configuration, monitor bus 254 is a shared bus. VIN 236 is coupled to each of the smart power stages 204 to supply power to each smart power stage 204. Each one of the inductors 208 is coupled between a switching node output (SW) 238 of a corresponding smart power stage 204 and the load 210. SW 238 may be coupled to a main circuit of a synchronous buck converter, connecting a high side field effect transistor (FET), a low side FET, and output inductor. The corresponding smart power stage 204 supplies power to load 210 via its corresponding inductor 208.

As shown in FIG. 2B, components of each smart power stage 204 of the plurality of smart power stages 204 may include a power circuit 250 having a driver, a high side field effect transistor (FET), and a low side FET, other logic 254, and a switch 242 having a one shot 244, which causes switch 242's on/off waveform to behave like a mono-stable multivibrator. In operation, switch 242 will turn on with a rising edge of a control signal received at PWM input 232 of the smart power stage 204 and will turn off after a pre-determined duration. When a switch 242 is turned on, the corresponding smart power stage 204 may send a temperature of smart power stage 204 at TOUT/FLT 234 of corresponding smart power stage 204 to voltage regulator controller 202 via monitor bus 254 during a reporting window, where the duration of the reporting window is from the rising edge of the control signal received to when switch 242 turns off after the pre-determined duration. This reporting window may be set to a duration that allows voltage regulator controller 202 to receive the temperature before requesting any other smart power stage 204 to report its temperature 252, so that the requested smart power stage 204 is the only one reporting its temperature on monitor bus 254 during the reporting window and does not overlap with any other smart power stage 204 reporting its temperature. Temperature 252 is buffered through a super diode circuit, also referred herein as a zero drop diode circuit, including a diode 246 and an amplifier 248. Operating in this manner, allows voltage regulator controller 202 to control which smart power stage 204 sends its temperature 252 to controller 202 and to determine that the temperature received at TSENSE 224 via monitor bus 254 corresponds to that particular smart power stage 204.

Referring back to FIG. 2A, during normal operation mode, the output of TOUT/FLT 234 of a particular smart power stage 204, e.g. TOUT/FLT 234-1, may be reporting temperature defined by an equation 8 mV/C+0.8V, where C is the die Celsius temperature and 0.8V corresponds to 25 C at baseline. When a particular smart power stage 204 is fault signaling, TOUT/FLT 234 of the particular smart power stage 204 may be pulled high, e.g. 3.3V, when the particular smart power stage 204 detects one or more of an over temperature protection (OTP) fault, an over current protection (OCP) fault, a FET shoot through fault, among other faults.

During operation, voltage regulator controller 202 may monitor the temperature of each individual smart power stage 204 of smart power stages 204-1 to 204-6 to provide phase to phase temperature balance control of smart power stages 204-1 to 204-6 and to detect an imminent fault of a particular smart power stage 204, described in further detail below. Multi-phase voltage regulator 200 may have an associated switching cycle including multiple phases that are distributed across one switching cycle, where each of the multiple phases corresponds to each of the plurality of smart power stages 204. In an exemplary embodiment, if a switching frequency of a four phase voltage regulator is 500 kHz, and therefore, the switching cycle is 2 μseconds, the rising edge of four PWM signals happen within 500 ns (2 μs/4) of each other.

During operation, voltage regulator controller 202 may send a first control signal to smart power stage 204-1 via signal line 252-1 to enable smart power stage 204-1 to send a first temperature of smart power stage 204-1 to voltage regulator controller 202 during a first phase of the switching cycle corresponding to smart power stage 204-1. In response to receiving the first control signal from voltage regulator controller 202 at PWM input 232-1 via signal line 252-1, switch 242-1 will turn on with the rising edge of the first control signal and smart power stage 204-1 will send the first temperature of smart power stage 204-1 to voltage regulator controller 202 via monitor bus 254 during the duration of the reporting window. Voltage regulator controller 202 may receive the first temperature of smart power stage 204-1 from smart power stage 204-1 via monitor bus 254 during the reporting window. Voltage regulator controller 202 may also determine that the first temperature received by voltage regulator controller 202 corresponds to smart power stage 204-1 based on the first control signal and that voltage regulator controller 202 has not requested any other smart power stages 204 to report their temperatures during the reporting window. When the reporting window closes, switch 242-1 turns off and smart power stage 204-1 stops reporting its temperature on monitor bus 254. Voltage regulator controller 202 may then make another temperature reporting request in a similar manner as previously described. For example, voltage regulator controller 202 may send a second control signal to smart power stage 204-2 via signal line 252-2 to enable smart power stage 204-2 to send a second temperature to voltage regulator controller 202 during a second reporting window. Similarly, voltage regulator controller 202 may determine that the second temperature corresponds to smart power stage 204-2 based on the second control signal and that voltage regulator controller 202 has not requested any other smart power stages 204 to report their temperatures during the second reporting window. The interaction between voltage regulator controller 202 and each of the smart power stages 204 is shown in more detail in FIG. 3.

Figure 3:
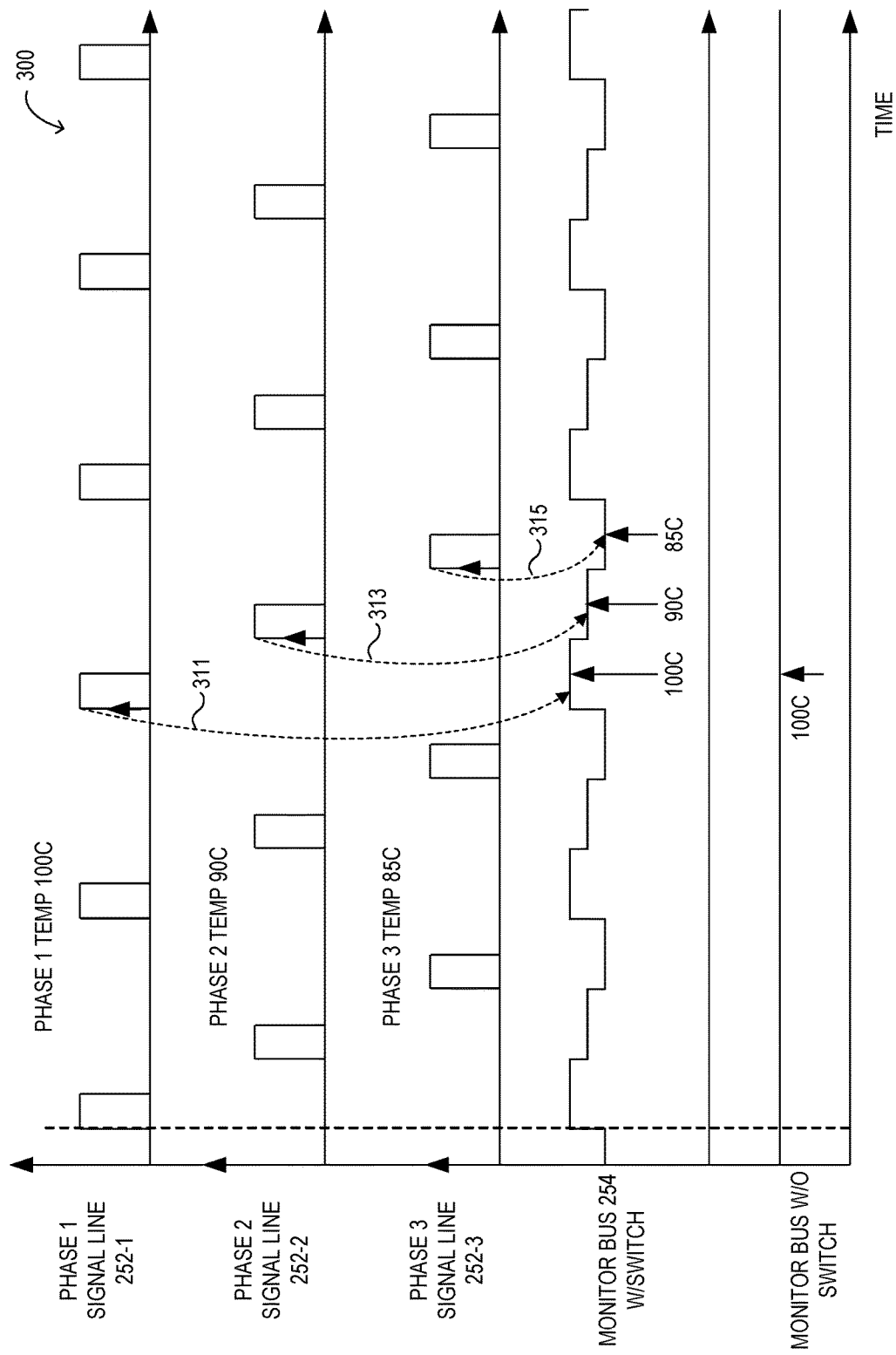
FIG. 3 is a timing diagram of phase control and monitor temperature bus signals for selected phases of an embodiment of a multi-phase voltage regulator.

Turning now to FIG. 3, a timing diagram 300 of phase signal line and monitor bus signals for selected elements of an embodiment of a multi-phase voltage regulator (e.g. multi-phase voltage regulator 200) is illustrated. The top three portions of timing diagram 300 show the three control signals sent by voltage regulator controller 202 to each corresponding smart power stage 204-1 (phase 1), 204-2 (phase 2), and 204-3 (phase 3) via signal lines 252-1, 252-2, and 252-3 respectively, where smart power stage 204-1 has a temperature of 100° C., smart power stage 204-2 has a temperature of 90° C., and smart power stage 204-3 has a temperature of 85° C. The fourth portion of timing diagram 200 shows the voltage level of monitor bus 254 corresponding to the temperature of each smart power stage, 204-1, 204-2, and 204-3, on monitor bus 254 during its specific reporting window. For example, the rising edge of the first control signal on signal line 252-1 causes smart power stage 204-1 to send its temperature to voltage regulator controller 202 by driving the voltage level of monitor bus 254 corresponding to the temperature 100° C. during a first reporting window, as depicted by dotted line arrow 311. As shown, voltage regulator controller 202 sent no other control signals via signal lines 252-2 and 252-3 to smart power stages 204-2 and 204-3 to send their temperatures, so only the temperature of smart power stage 204-1 is shown on monitor bus 254 during the first reporting window. Similarly, the rising edges of the second and third control signals causes smart power stages 204-2 and 204-3 to send their temperatures to voltage regulator controller 202 by driving the voltage level of monitor bus 254 corresponding to temperatures 90° C. and 85° C. during a second and a third reporting window respectively, as depicted by dotted line arrows 313 and 315. For reference, the fifth portion of timing diagram 200 labeled MONITOR BUS W/O SWITCH shows the case where smart power stages of a voltage regulator controller do not include switch 242 and, as such, each smart power stage sends its temperature to the voltage regulator controller by driving the voltage level of the monitor bus corresponding to each of the respective temperatures 100° C., 90° C., and 85° C. during the same reporting window. In this case, the highest temperature 100° C. dominates the monitor bus and the temperature of each of the smart power stages is unknown to the voltage regulator controller.

Referring back to FIG. 2A, in one or more embodiments, voltage regulator controller 202 may monitor the temperature of each individual smart power stage 204 of the plurality of smart power stages 204 for phase to phase temperature balance control of the plurality of smart power stages 204. The temperature of each individual smart power stage 204 may be quite different than each of the other individual smart power stages 204 due to a difference in cooling and airflow at each of the individual smart power stages 204. For example, the physical location, e.g. center, middle, edge, side, amongst other locations, of each individual smart power stage 204 may be different between each of the other smart power stages 204, which may result in different levels of airflow at each location leading to differences in the level of cooling provided. The loads of each of the smart power stages 204 may also be different, resulting in further differences in temperature. In an exemplary embodiment, temperature differences of 10° C. or higher between individual smart power stages 204 located in center positions and those located in side positions during heavy load conditions. These temperature differences may lead to decreased reliability and lifetime of some of smart power stages 204. In order to address these issues, voltage regulator controller 202 may make phase and load decisions based on temperature to better share the loads and minimize these differences.

For each of the individual smart power stages 204, voltage regulator controller 202 may acquire the temperature of the individual smart power stage 204 in real time, as previously described with reference to FIGS. 2A and 2B. Upon acquiring the temperatures of each of the individual smart power stages 204, voltage regulator controller 202 may calculate their average temperature. For each of the individual smart power stages 204, voltage regulator controller 202 may determine whether the value of the temperature of the individual smart power stage 204 is equal to or greater than a value of a temperature imbalance threshold. The value of the temperature imbalance threshold may be programmable. The value of the temperature imbalance threshold may be based on the design parameters of voltage regulator controller 202, monitoring smart power stage 204 information over time, amongst other considerations. In another embodiment, the value of the temperature imbalance threshold may further include an average temperature of the individual smart power stages 204, e.g. the temperature imbalance threshold may be equal to a value of a programmable imbalance threshold plus the average temperature, where the average temperature may be a calculated value.

When the value of the temperature of the individual smart power stage 204 is less than the value of the temperature imbalance threshold, voltage regulator controller 202 may wait a first delay value before monitoring and acquiring a new temperature of each individual smart power stage 204 of the plurality of smart power stages 204 for phase to phase temperature balance control of the plurality of smart power stages 204. When the value of the temperature of the individual smart power stage 204 is equal to or greater than the value of the temperature imbalance threshold, voltage regulator controller 202 may reduce a duty cycle of the phase corresponding to the individual smart power stage 204 and adjust each duty cycle of each of the plurality of the other phases corresponding individual smart power stages 204 according to a temperature balance control policy. Voltage regulator controller 202 may then wait a second delay value before monitoring and acquiring a new temperature of each individual smart power stage 204 of the plurality of smart power stages 204 for phase to phase temperature balance control of the plurality of smart power stages 204.

By performing phase to phase temperature balance control of the plurality of smart power stages 204 in this manner, may provide increased temperature margin for an information handling system including an application of a multi-phase voltage regulator 200 coupled to the information handling system in limited or non-existent air conditioning equipment environment, such as a modular datacenter environment. This may also result in more cost effective voltage regulator designs for various information handling systems, e.g. a server or a workstation, by enabling a reduction in a number of phases in the switching cycle.

In one or more embodiments, voltage regulator controller 202 may utilize the temperature of each individual smart power stage 204 of the plurality of smart power stages 204 for the prediction and avoidance of one or more imminent faults of particular smart power stages 204. Temperature may be a good indicator of imminent faults, where a temperature of an individual smart power stage 204 that exceeds a high temperature threshold value may result in a failure of the individual smart power stage 204, loss of power to information handling system, and loss of data in the information handling system. Similar to phase to phase temperature balance control, when the value of the temperature of the individual smart power stage 204 is equal to or greater than the value of the temperature imbalance threshold, voltage regulator controller 202 may predict an imminent fault of the individual smart power stage 204. Similarly, when the value of the temperature of the individual smart power stage 204 has a sudden increase from a previous value, voltage regulator controller 202 may also predict an imminent fault of the individual smart power stage 204. Based on this prediction, voltage regulator controller 202 may perform further processing to avoid the imminent fault. For example, voltage regulator controller 202 may send a warning to multi-phase voltage regulator 200 that indicates the imminent fault of the individual smart power stage 204; perform load balancing to reduce the temperature, among other failure avoidance methods. Early fault prediction and identification may be provided, while still enabling defined catastrophic failure protection.

Figure 4A:
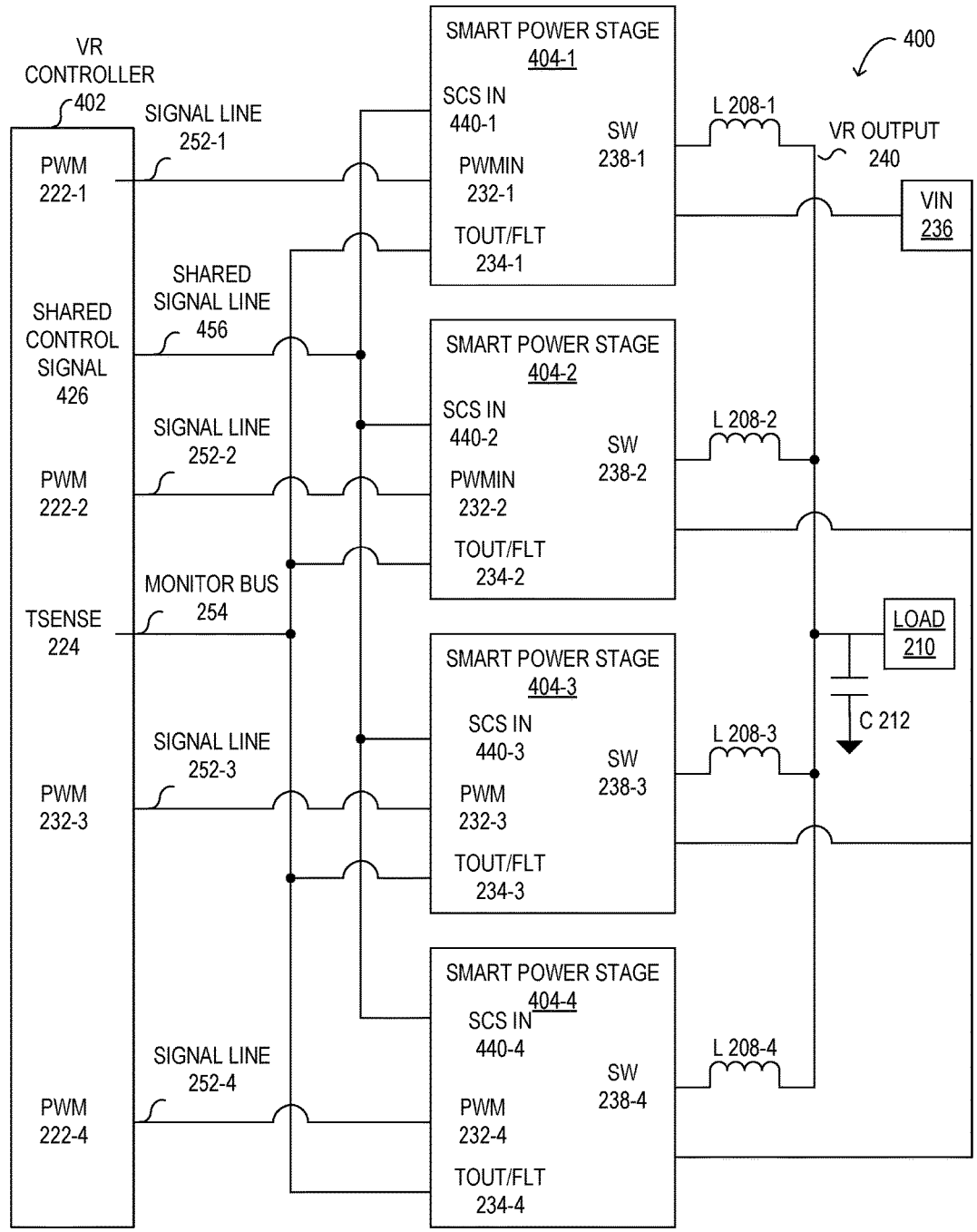
FIG. 4A is a circuit diagram of selected elements of an embodiment of a multi-phase voltage regulator having a shared signal line.
Figure 4B:
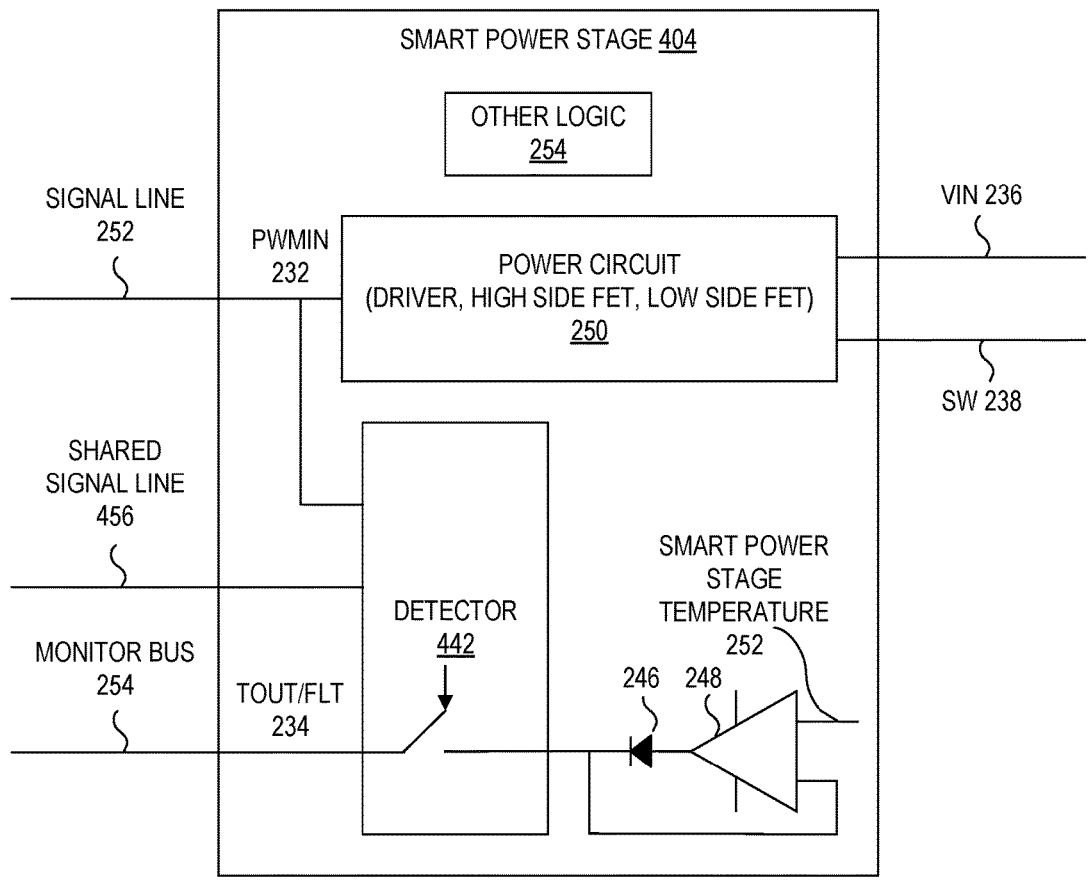
FIG. 4B is a circuit diagram of selected elements of an embodiment of a smart power stage of a multi-phase voltage regulator having a shared signal line.

Turning now to FIGS. 4A and 4B, a circuit diagram of selected elements of an embodiment of a multi-phase voltage regulator 400 is illustrated. In FIGS. 4A and 4B, multi-phase voltage regulator 400 is shown in a schematic representation and is not drawn to scale or perspective. It is noted that, in different embodiments, multi-phase voltage regulator 400 may be operated with additional or fewer elements. Multi-phase voltage regulator 400 has similar structure and functionality as multi-phase voltage regulator 200.

As shown in FIG. 4A, components of multi-phase voltage regulator 400 may include, but are not limited to, a voltage regulator controller 402, a plurality of smart power stages 404, among other components previously described with reference to FIGS. 2A and 2B. A shared signal line 456 is coupled between voltage regulator controller 402 and each of the plurality of smart power stages 404. For example, shared signal line 456 is coupled between shared control signal output 426 of voltage regulator controller 402 and a plurality of corresponding shared control signal inputs (SCS IN) 440 including shared control signal input 440-1 to 440-4 of smart power stages 404-1 to 404-4. Voltage regulator controller 402 operates similarly to voltage regulator controller 202 but also utilizes a shared control signal sent to smart power stages 404 via shared signal line 456 for temperature monitoring described in further detail below. Shared signal line may be an identification output line (ID OUT) of voltage regulator controller 402, which may be a bidirectional communication line. Voltage regulator controller 402 may receive an identification signal from a smart power stage 404 allowing it to determine the smart power stage 404's vendor part identification during an initialization or configuration phase. During operation, voltage regulator controller 402 may send shared control signals to communicate with each smart power stage 404.

As shown in FIG. 4B, components of each smart power stage 404 of the plurality of smart power stages 404 may include a detector 442 having a switch, among other components previously described with reference to FIGS. 2A and 2B. In operation, detector 442 will turn on the switch when a sequence of one or more shared control signals are received at the smart power stage 404 via shared signal line 456 during a temperature request duration and a sequence of control signals are received at PWM input 232 of the smart power stage 404 that coincide with reception of the sequence of the one or more shared control signals at the smart power stage 404. The sequence of the one or more shared control signals may have a pre-determined number of shared control signals within it, where a sequence including two or more shared control signals may be utilized to avoid noise that may result in a false detection. Detector 442 may start a count at zero and count the number of shared control signals received that are coincident with the reception of the sequence of control signals at PWM input 232 to determine when the pre-determined number of shared control signals has been reached during the temperature request duration. When the temperature request duration has expired, the count may be reset back to zero. Detector 442 will turn off the switch after a pre-determined duration.

When the switch of detector 442 is turned on, the corresponding smart power stage 404 may send a temperature of smart power stage 404 at TOUT/FLT 234 of corresponding smart power stage 404 to voltage regulator controller 402 via monitor bus 254 during a reporting window, where the duration of the reporting window starts at the falling edge of the last shared control signal of the sequence of the one or more shared control signals control signal received. This reporting window may be set to a duration that allows voltage regulator controller 402 to receive the temperature before requesting any other smart power stage 404 to report its temperature, so that the requested smart power stage 404 is the only one reporting its temperature on monitor bus 254 during the reporting window and does not overlap with any other smart power stage 404 reporting its temperature. Operating in this manner, allows voltage regulator controller 402 to control which smart power stage 404 sends its temperature to controller 402 and to determine that the temperature received at TSENSE 224 via monitor bus 254 corresponds to that particular smart power stage 404.

Referring back to FIG. 4A, during operation, voltage regulator controller 402 may send a first sequence of control signals to smart power stage 404-1 via signal line 252-1. Voltage regulator controller 402 may also send a sequence of one or more shared control signals to smart power stage 404-1 via shared signal line 456 that coincide with sending the first sequence of control signals during a temperature request duration. Sending both the first sequence of control signals and the sequence of the one or more shared control signals enables smart power stage 404-1 to send a first temperature of smart power stage 404-1 to voltage regulator controller 402 during the reporting window. In response to receiving the first sequence of control signals and the sequence of the one or more shared control signals from voltage regulator controller 402, smart power stage 404-1 will send the first temperature of smart power stage 404-1 to voltage regulator controller 402 during the reporting window, as described above. Voltage regulator controller 402 may receive the first temperature of smart power stage 404-1 from smart power stage 404-1 via monitor bus 254 during the reporting window. Voltage regulator controller 402 may also determine that the first temperature received by voltage regulator controller 402 corresponds to smart power stage 404-1 based on the sequence of the one or more shared control signals and that voltage regulator controller 402 has not requested any other smart power stages 404 to report their temperatures during the reporting window. When the reporting window closes, voltage regulator controller 402 may then make another temperature reporting request in a similar manner as previously described. The interaction between voltage regulator controller 402 and each of the smart power stages 404 is shown in more detail in FIG. 5.

Turning now to FIG. 5, a timing diagram 500 of shared signal line, phase signal line, and monitor bus signals for selected elements of an embodiment of a multi-phase voltage regulator (e.g. multi-phase voltage regulator 400) is illustrated. The top portion of timing diagram 500 shows sequences of one or more shared control signals sent by voltage regulator controller 402 to each corresponding smart power stage 404-1 (phase 1), 404-2 (phase 2), and 404-3 (phase 3) via shared signal line 456. The middle portions of timing diagram 500 show the three sequences of control signals sent by voltage regulator controller 402 to each corresponding smart power stage 404-1, 404-2, and 404-3 via signal lines 252-1, 252-2, and 252-3 respectively. The bottom portion of timing diagram 500 shows the voltage level of monitor bus 254 corresponding to the reported temperature of each smart power stage 404-1 and 404-2 on monitor bus 254 during its specific reporting window. For example, voltage regulator controller 402 sends the first sequence of two shared control signals that coincide with two control signals sent to smart power stage 402-1 via phase 1 signal line 252-1, as depicted by dotted line arrow 511. Smart power stage 402-1 detects the coincidence of the second shared control signal of the first sequence, labeled Pstage 1 detection 502 and causes smart power stage 404-1 to send its temperature, TOUT Pstage1 504, after a short delay, to voltage regulator controller 402 by driving the voltage level of monitor bus 254 during a first reporting window, as depicted by dotted line arrow 513. Only smart power stage 404-1 sends its temperature over shared monitor bus 254 during the first reporting window. Similarly, voltage regulator controller 402 sends the second sequence of two shared control signals that coincide with two control signals sent to smart power stage 402-2 via phase 2 signal line 252-2, as depicted by dotted line arrow 515. Smart power stage 402-2 detects the coincidence of the second shared control signal of the second sequence, labeled Pstage 2 detection 506 and causes smart power stage 404-2 to send its temperature, TOUT Pstage2 508, after a short delay, to voltage regulator controller 402 by driving the voltage level of monitor bus 254 during a second reporting window, as depicted by dotted line arrow 517.

Figure 6A:
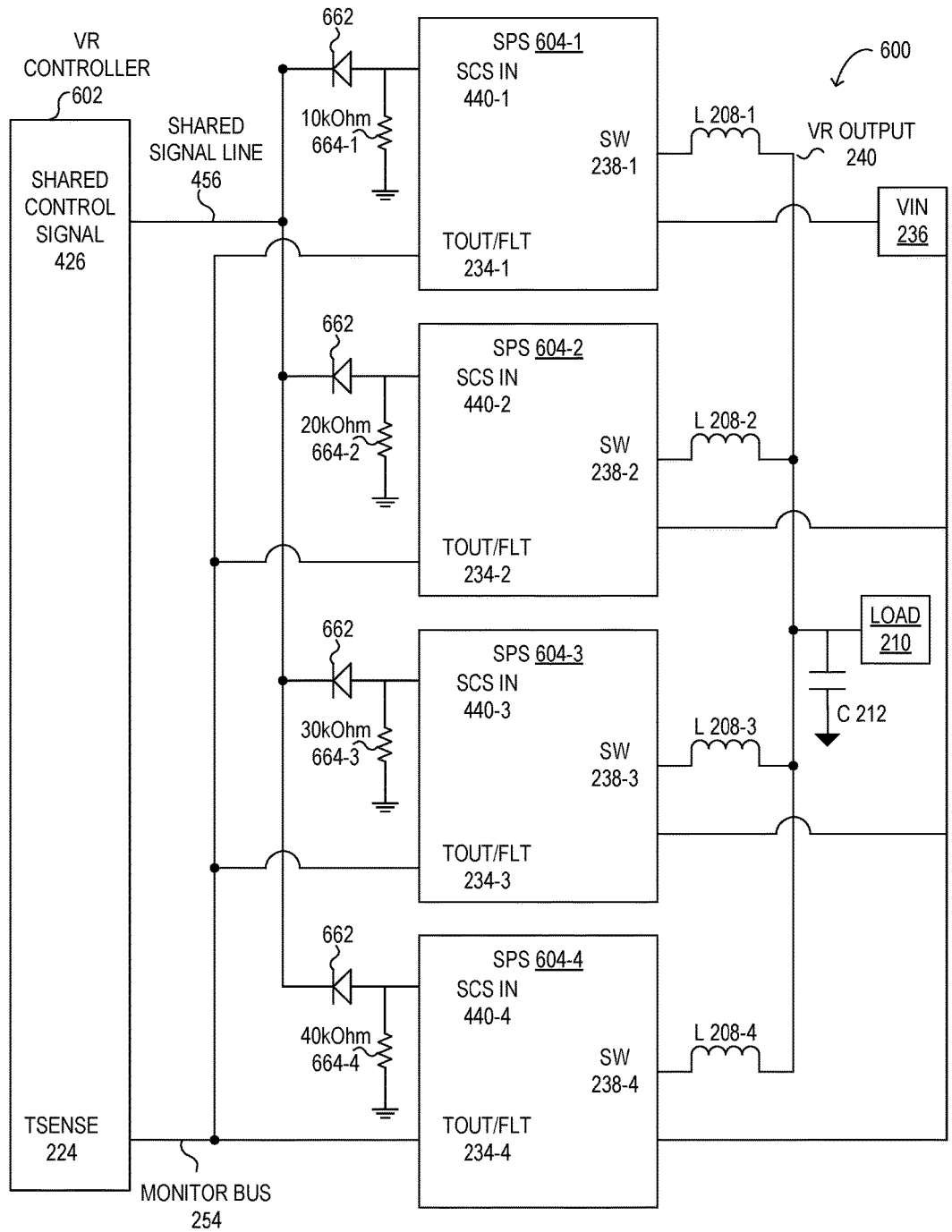
FIG. 6A is a circuit diagram of selected elements of an embodiment of a multi-phase voltage regulator with smart power stage pin strapping.
Figure 6B:
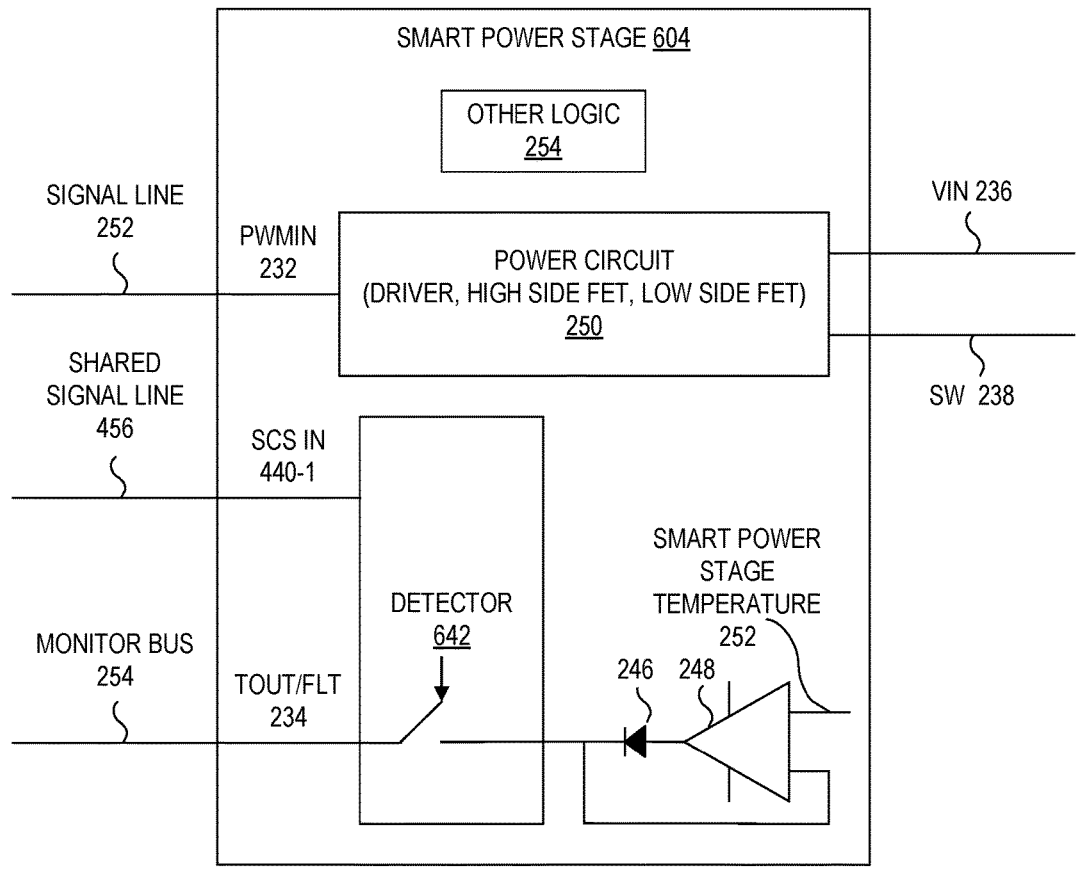
FIG. 6B is a circuit diagram of selected elements of an embodiment a smart power stage of a multi-phase voltage regulator with smart power stage pin strapping.

Turning now to FIGS. 6A and 6B, a circuit diagram of selected elements of an embodiment of a multi-phase voltage regulator 600 is illustrated. In FIGS. 6A and 6B, multi-phase voltage regulator 600 is shown in a schematic representation and is not drawn to scale or perspective. It is noted that, in different embodiments, multi-phase voltage regulator 600 may be operated with additional or fewer elements. Multi-phase voltage regulator 600 has similar structure and functional operation as multi-phase voltage regulator 400.

As shown in FIG. 6A, components of multi-phase voltage regulator 600 may include, but are not limited to, a voltage regulator controller 602, a plurality of smart power stages 604 including smart power stages 604-1 to 604-4, among other components previously described with reference to FIGS. 2A, 2B, 4A, and 4B. Shared signal line 456 is coupled between voltage regulator controller 602 and each of smart power stages 604. For example, shared signal line 456 is coupled between shared control signal output 426 of voltage regulator controller 602 and the plurality of corresponding shared control signal inputs 440 including shared control signal input 440-1 to 440-4 of smart power stages 604-1 to 604-4 via a corresponding diode 662 and a corresponding resistor circuit 664-1 to 664-4 respectively. Each smart power stage 604 uses a different resistor connection, also called pin strapping, to distinguish which phase corresponds to which smart power stage 604. For example, smart power stage 604-1 uses a 10 k Ohm resistor for resistor circuit 664-1. Similarly, smart power stages 604-2 to 604-4 uses a 20 k Ohm resistor, a 30 k Ohm resistor, and 40 k Ohm resistor for resistor circuit 664-2 to 664-4 respectively. Voltage regulator controller 602 operates similarly to voltage regulator controller 402 but only utilizes shared control signals sent to the plurality of the smart power stages 604 via shared signal line 456 for temperature monitoring described in further detail below.

As shown in FIG. 6B, components of each smart power stage 604 of the plurality of smart power stages 604 may include a detector 642 having a switch, among other components previously described with reference to FIGS. 2A, 2B, 4A, and 4B. In operation, detector 642 will turn on the switch when a count of a sequence of one or more shared control signals are received at the smart power stage 604 via shared signal line 456 during a temperature request duration matches a pre-defined number corresponding to the smart power stage 604. In an exemplary embodiment, the pre-defined number for smart power stages 604-1, 604-2, and 604-3 may correspond to the numbers 1, 2, and 3 respectively. Detector 642 may start a count at zero and count the number of shared control signals received during temperature request duration. When the temperature request duration is reached, detector 642 may determine whether the count matches the pre-defined number corresponding to its smart power stage 604. After this determination, the count may be reset back to zero. Detector 642 will turn off the switch after a pre-determined duration to ensure only one smart power stage 604 reports it temperature over monitor bus 254 at a time. When the switch of detector 642 is turned on, the corresponding smart power stage 604 may send a temperature of smart power stage 604 to voltage regulator controller 602 via monitor bus 254 during a reporting window, where the duration of the reporting window starts when the temperature request duration is reached.

Referring back to FIG. 6A, during operation, voltage regulator controller 602 may send a first sequence of one or more shared control signals to smart power stages 604-1, 604-2 and 604-3 via signal line 252-1. During the temperature request duration, each detector 642-1, 642-2 and 642-3 counts the number of shared control signals received by its corresponding smart power stage 604-1, 604-2, and 604-3. When the temperature request duration is reached, each detector 642-1, 642-2 and 642-3 may determine whether its count matches the pre-defined number corresponding to its smart power stage 604-1, 604-2, and 604-3. When the count of a particular smart power stage 604 matches its corresponding pre-defined number, the particular smart power stage 604 will send the first temperature of the matching smart power stage 604 to voltage regulator controller 602 during the reporting window, as described above. Voltage regulator controller 602 may determine that the first temperature received by voltage regulator controller 602 corresponds to the matching smart power stage 604 based on the first sequence of the one or more shared control signals and that voltage regulator controller 602 has not requested any other smart power stages 604 to report their temperatures during the reporting window. When the reporting window closes, voltage regulator controller 602 may then make another temperature reporting request in a similar manner as previously described. The interaction between voltage regulator controller 602 and each of the smart power stages 604 is shown in more detail in FIG. 7.

Figure 7:
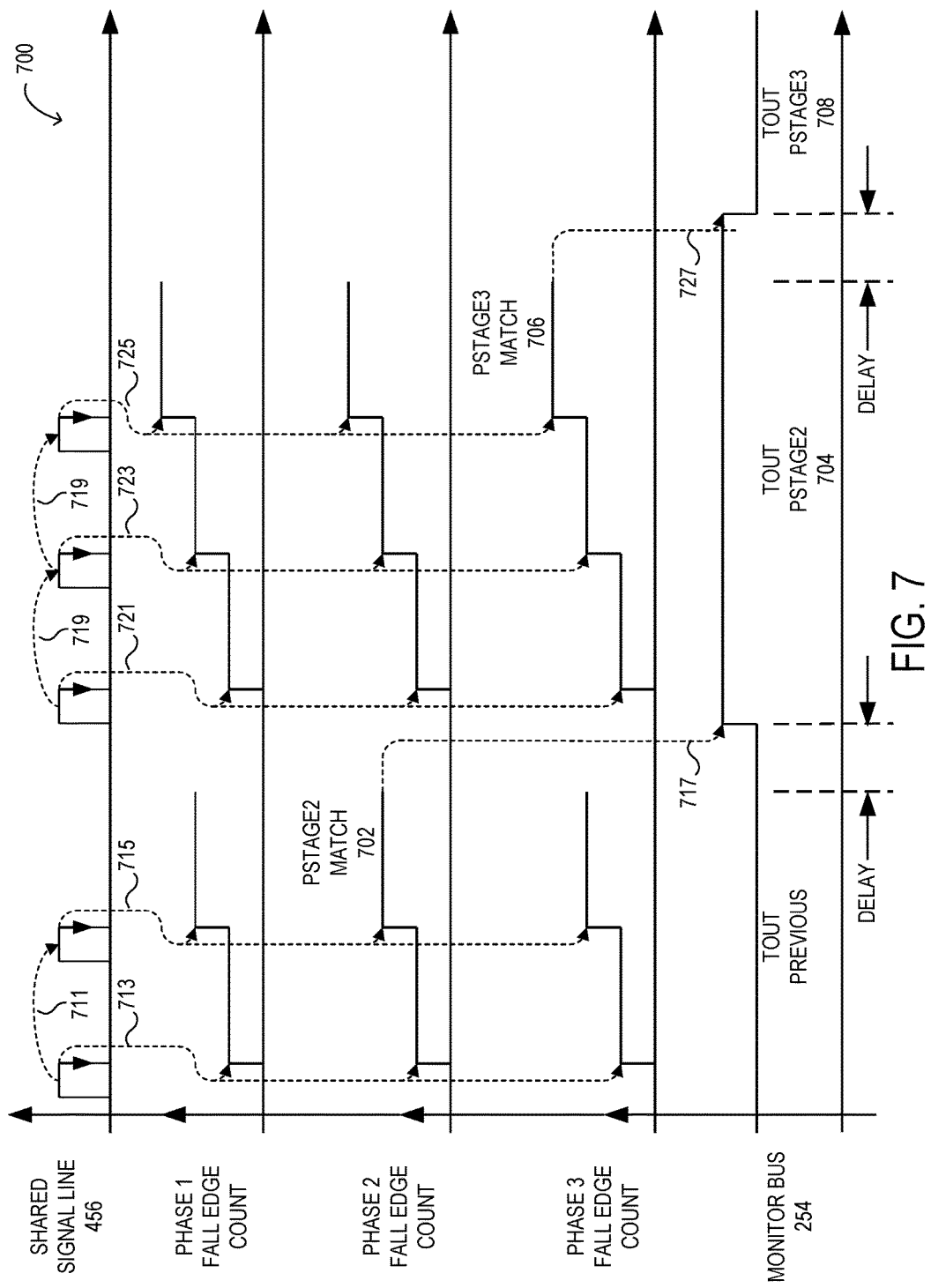
FIG. 7 is a timing diagram of shared signal line signals and phase falling edge counts for selected elements of an embodiment of a multi-phase voltage regulator with smart power stage pin strapping.

Turning now to FIG. 7, a timing diagram 700 of shared signal line, smart power stage falling edge count values, and monitor bus signals for selected elements of an embodiment of a multi-phase voltage regulator (e.g. multi-phase voltage regulator 600) is illustrated. The top portion of timing diagram 700 shows sequences of one or more shared control signals sent by voltage regulator controller 602 to each corresponding smart power stage 604-1 (phase 1), 604-2 (phase 2), and 604-3 (phase 3) via shared signal line 456. The middle portions of timing diagram 700 show the falling edge count values of each smart power stage 604-1, 604-2, and 604-3. The bottom portion of timing diagram 700 shows the voltage level of monitor bus 254 corresponding to the reported temperature of each smart power stage 604-2 and 604-3 on monitor bus 254 during its specific reporting window. For example, voltage regulator controller 602 sends the first sequence of two shared control signals to smart power stages 604-1, 604-2, and 604-3 via shared signal line 456, as depicted by dotted line arrow 711. Each smart power stage 604 detects the falling edge of the first shared control signal of the first sequence and increases its count from zero to one, depicted by dotted line arrows 713. Similarly, each smart power stage 604 detects the falling edge of the second shared control signal of the first sequence and increases its count from one to two, depicted by dotted line arrows 715 during the temperature request duration. When the temperature request duration has been reached, smart power stage 604-2 determines that its corresponding number matches its count of two, labeled Pstage2 match 702, and causes smart power stage 604-2 to send its temperature, TOUT Pstage2 704, to voltage regulator controller 602 by driving the voltage level of monitor bus 254 during a first reporting window, as depicted by dotted line arrow 717. Only smart power stage 604-2 sends its temperature over shared monitor bus 254 during the first reporting window.

Similarly, voltage regulator controller 602 sends the second sequence of three shared control signals to smart power stages 604-1, 604-2, and 604-3 via shared signal line 456, as depicted by dotted line arrows 719. Each smart power stage 604 detects the falling edge of the first, second, and third shared control signals of the second sequence and increases its count from zero, to one, to two, to three, depicted by dotted line arrows 721, 723, and 725 respectively during the temperature request duration. When the temperature request duration has been reached, smart power stage 604-3 determines that its corresponding number matches its count of three, labeled Pstage3 match 706, and causes smart power stage 604-3 to send its temperature, TOUT Pstage3 708, to voltage regulator controller 602 by driving the voltage level of monitor bus 254 during a second reporting window, as depicted by dotted line arrow 727. Only smart power stage 604-3 sends its temperature over shared monitor bus 254 during the second reporting window.

Figure 8:
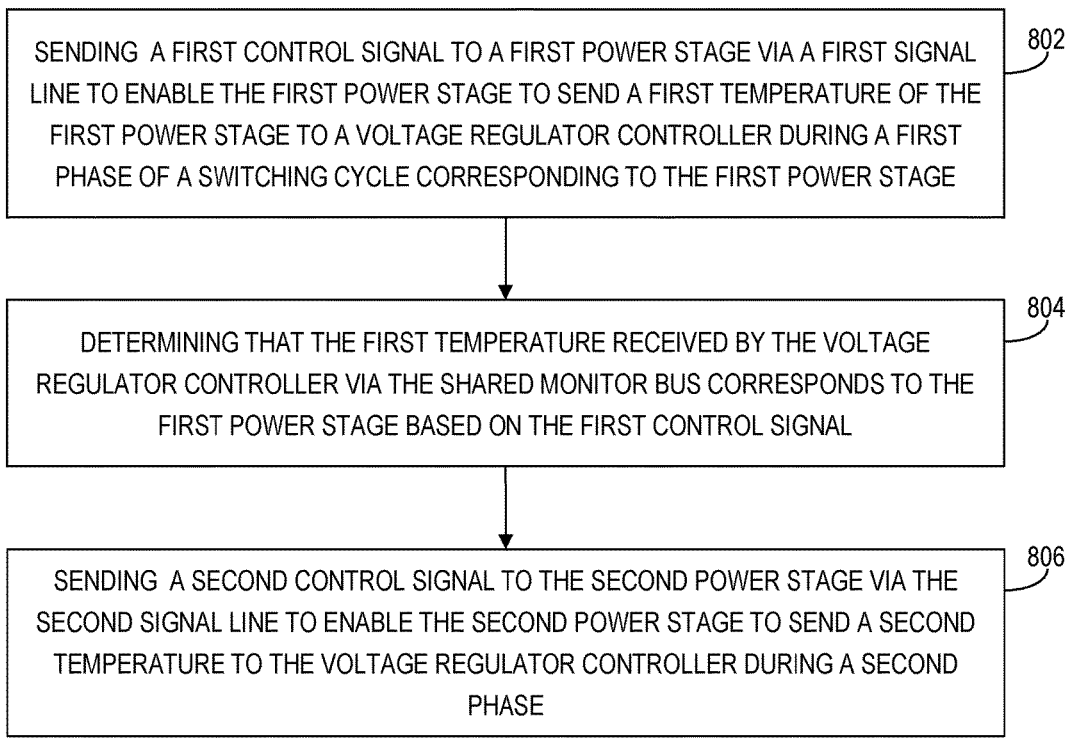
FIG. 8 is flowchart depicting selected elements of an embodiment of a method for individual phase temperature monitoring and balance control in a smart power stage based multi-phase voltage regulator.

Referring now to FIG. 8, a block diagram of selected elements of an embodiment of a method for individual phase temperature monitoring and balance control in a smart power stage based multi-phase voltage regulator (such as multi-phase voltage regulator 200) is depicted in flowchart form. It is noted that certain operations described in method 800 may be optional or may be rearranged in different embodiments.

The multi-phase voltage regulator may include a plurality of smart power stages including a first smart power stage and a second smart power stage. The multi-phase voltage regulator may also include a controller coupled to: the first smart power stage by a first signal line and a shared monitor bus, and the second smart power stage by a second signal line and the shared monitor bus.

Method 800 may begin at step 802, sending, by the voltage regulator controller, a first control signal to the first smart power stage via the first signal line to enable the first smart power stage to send a first temperature of the first smart power stage to the voltage regulator controller during a first phase of a switching cycle corresponding to the first smart power stage. At step 804, determining that the first temperature received by the voltage regulator controller via the shared monitor bus corresponds to the first smart power stage based on the first control signal. At step 806, sending a second control signal to the second smart power stage via the second signal line to enable the second smart power stage to send a second temperature to the voltage regulator controller during a second phase.

Figure 9:
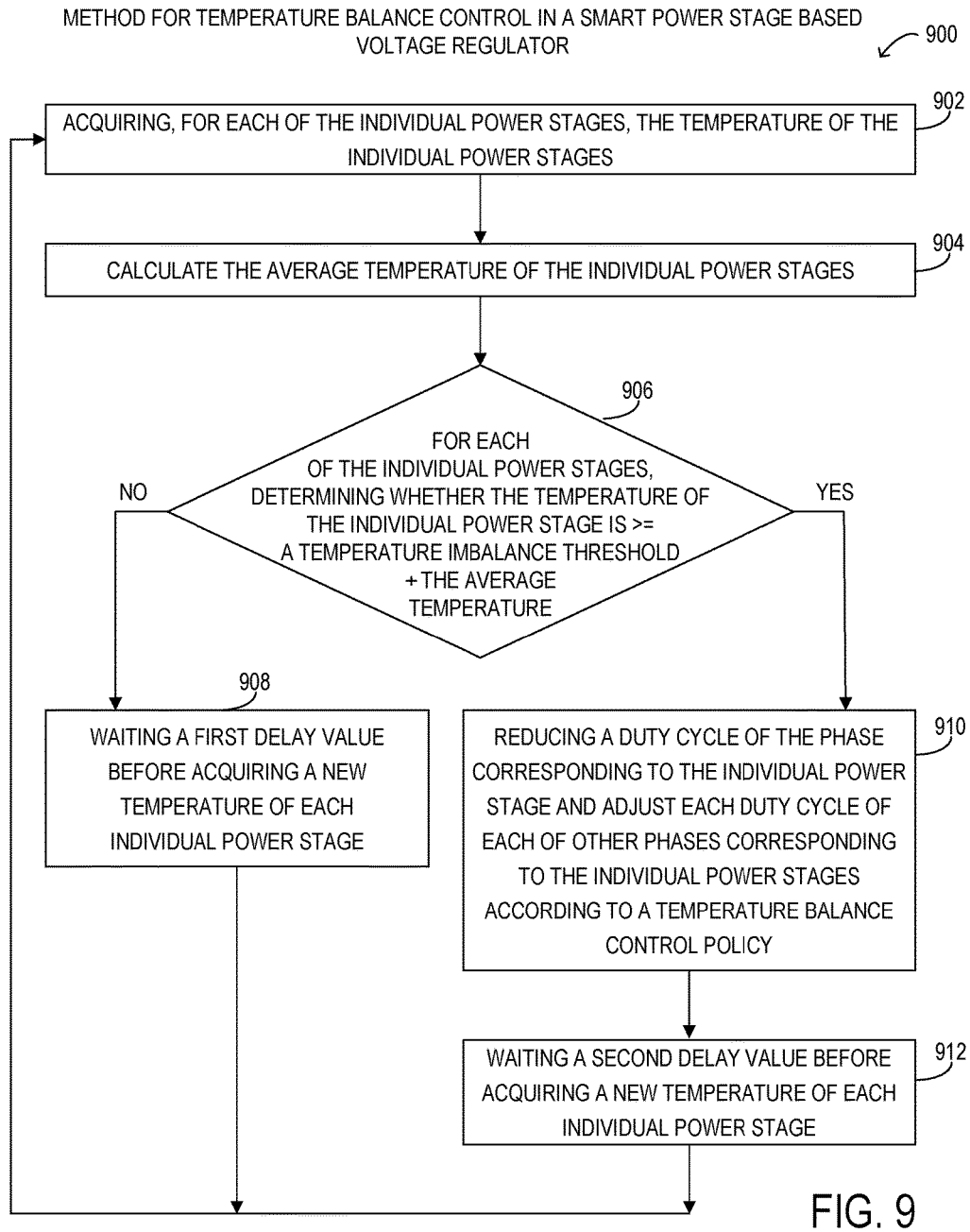
FIG. 9 is flowchart depicting selected elements of an embodiment of a method for temperature balance control in a smart power stage based multi-phase voltage regulator.

Referring now to FIG. 9, a block diagram of selected elements of an embodiment of a method for temperature balance control in a smart power stage based multi-phase voltage regulator (such as multi-phase voltage regulators 200, 400 and 600) is depicted in flowchart form. It is noted that certain operations described in method 900 may be optional or may be rearranged in different embodiments.

The multi-phase voltage regulator may include a plurality of smart power stages including a first smart power stage and a second smart power stage. The multi-phase voltage regulator may also include a controller coupled to: the first smart power stage by a first signal line and a shared monitor bus, and the second smart power stage by a second signal line and the shared monitor bus.

Method 900 may begin at step 902, acquiring, for each of the individual smart power stages, the temperature of the individual smart power stages. At step 904, the method may calculate the average temperature of the individual smart power stages. At step 906, for each of the individual smart power stages, determining whether the value of the temperature of the individual smart power stage is equal to or greater than a value of a temperature imbalance threshold. At step 908, waiting, when the value of the temperature of the individual smart power stage is less than the value of the temperature imbalance threshold, a first delay value before acquiring a new temperature of each individual smart power stage. At step 910, reducing, when the value of the temperature of the individual smart power stage is equal to or greater than the value of the temperature imbalance threshold, a duty cycle of the phase corresponding to the individual smart power stage and adjust each duty cycle of each of the plurality of the other phases corresponding to the individual smart power stages according to a temperature balance control policy. At step 912, waiting a second delay value before acquiring a new temperature of each individual smart power stage.

Figure 10:
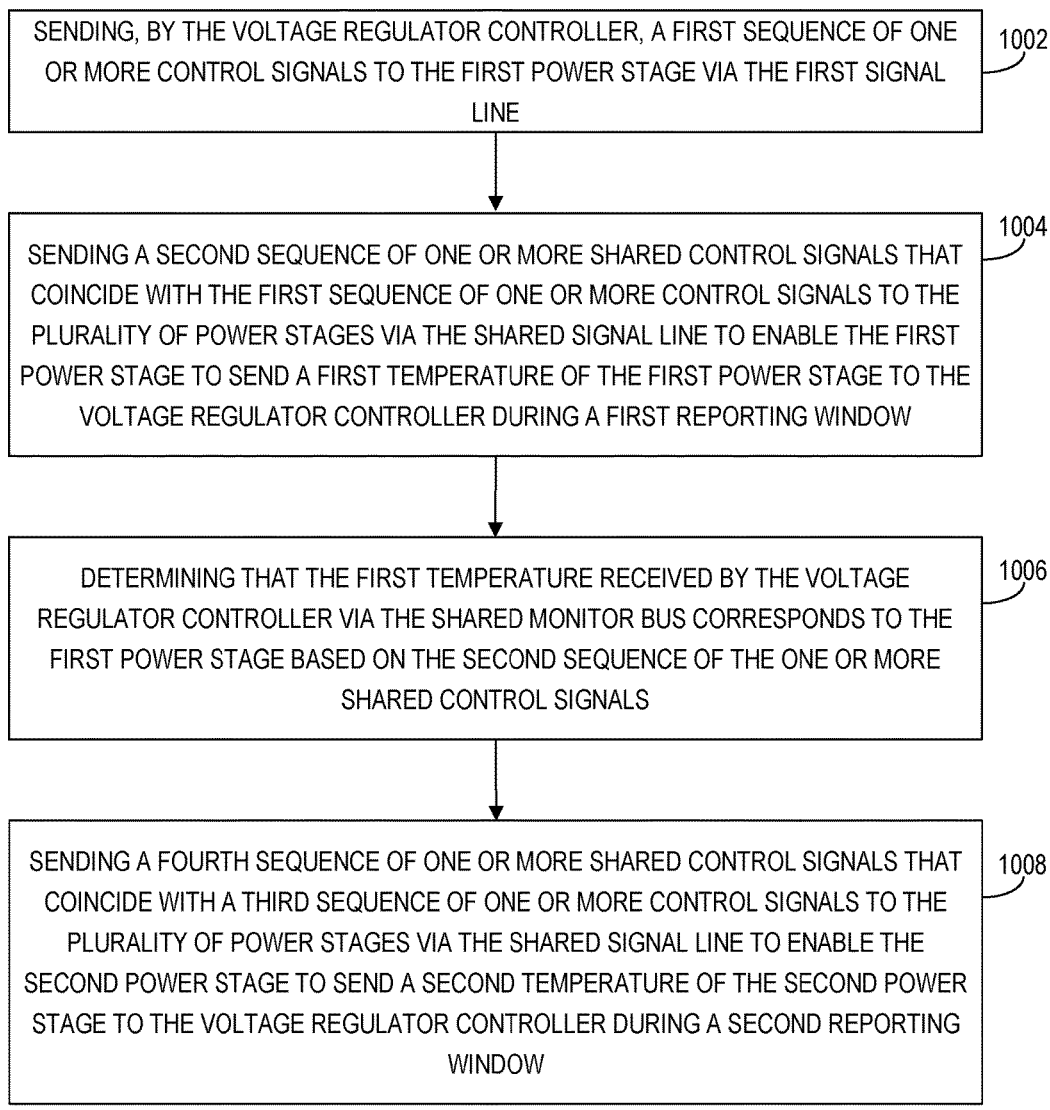
FIG. 10 is flowchart depicting selected elements of an embodiment of a method for individual phase temperature monitoring and balance control in a smart power stage based multi-phase voltage regulator.

Referring now to FIG. 10, a block diagram of selected elements of an embodiment of a method for individual phase temperature monitoring and balance control in a smart power stage based multi-phase voltage regulator (such as multi-phase voltage regulator 400) is depicted in flowchart form. It is noted that certain operations described in method 1000 may be optional or may be rearranged in different embodiments.

The multi-phase voltage regulator may include a plurality of smart power stages including a first smart power stage and a second smart power stage. The multi-phase voltage regulator may also include a voltage regulator controller coupled to: the first smart power stage by a first signal line, a shared signal line, and a shared monitor bus, and the second smart power stage by a second signal line, the shared signal line, and the shared monitor bus.

Method 1000 may begin at step 1002, sending, by the voltage regulator controller, a first sequence of one or more control signals to the first smart power stage via the first signal line. At step 1004, sending a second sequence of one or more shared control signals that coincide with the first sequence of one or more control signals to the plurality of smart power stages via the shared signal line to enable the first smart power stage to send a first temperature of the first smart power stage to the voltage regulator controller during a first reporting window. At step 1006, determining that the first temperature received by the voltage regulator controller via the shared monitor bus corresponds to the first smart power stage based on the second sequence of the one or more shared control signals. At step 1008, sending a fourth sequence of one or more shared control signals that coincide with a third sequence of one or more control signals to the plurality of smart power stages via the shared signal line to enable the second smart power stage to send a second temperature of the second smart power stage to the voltage regulator controller during a second reporting window.

Figure 11:
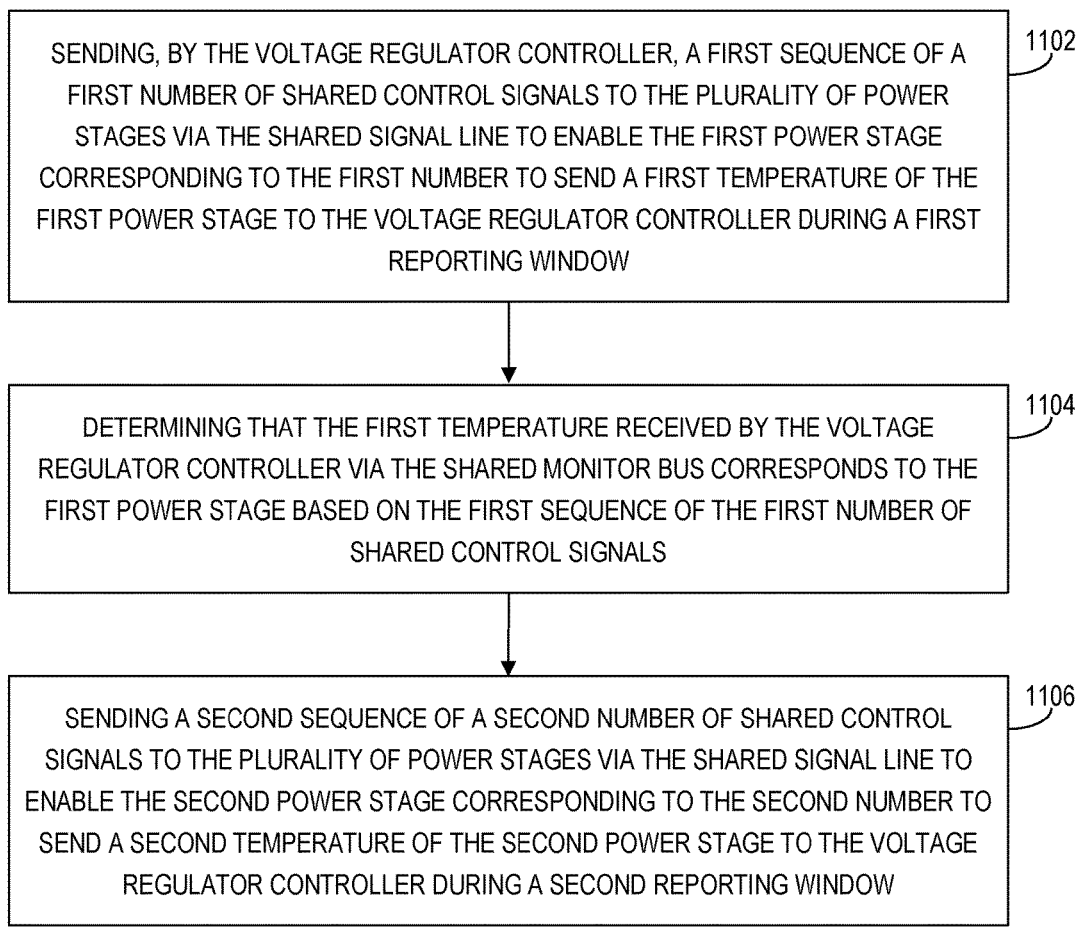
FIG. 11 is flowchart depicting selected elements of an embodiment of a method for individual phase temperature monitoring and balance control in a smart power stage based multi-phase voltage regulator.

Referring now to FIG. 11, a block diagram of selected elements of an embodiment of a method for individual phase temperature monitoring and balance control in a smart power stage based multi-phase voltage regulator (such as multi-phase voltage regulator 600) is depicted in flowchart form. It is noted that certain operations described in method 1100 may be optional or may be rearranged in different embodiments.

The multi-phase voltage regulator may include a plurality of smart power stages including a first smart power stage and a second smart power stage. The multi-phase voltage regulator may also include a voltage regulator controller coupled to: the first smart power stage by a shared signal line and a shared monitor bus, and the second smart power stage by the shared signal line and the shared monitor bus.

Method 1100 may begin at step 1102, sending, by the voltage regulator controller, a first sequence of a first number of shared control signals to the plurality of smart power stages via the shared signal line to enable the first smart power stage corresponding to the first number to send a first temperature of the first smart power stage to the voltage regulator controller during a first reporting window. At step 1104, determining that the first temperature received by the voltage regulator controller via the shared monitor bus corresponds to the first smart power stage based on the first sequence of the first number of shared control signals. At step 1106, sending a second sequence of a second number of shared control signals to the plurality of smart power stages via the shared signal line to enable the second smart power stage corresponding to the second number to send a second temperature of the second smart power stage to the voltage regulator controller during a second reporting window.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A multi-phase voltage regulator, comprising:
   a plurality of smart power stages including a first smart power stage and a second smart power stage; and
   a controller coupled to:
      the first smart power stage by a first signal line and a shared monitor bus, and
      the second smart power stage by a second signal line and the shared monitor bus,
   the voltage regulator controller to:
      send a first control signal to the first smart power stage via the first signal line to enable the first smart power stage to send a first temperature of the first smart power stage to the voltage regulator controller during a first phase of a switching cycle corresponding to the first smart power stage;
      determine that the first temperature received by the voltage regulator controller via the shared monitor bus corresponds to the first smart power stage based on the first control signal; and
      send a second control signal to the second smart power stage via the second signal line to enable the second smart power stage to send a second temperature to the voltage regulator controller during a second phase.

2. The multi-phase voltage regulator of claim 1, the voltage regulator controller further to:
   determine that the second temperature received by the voltage regulator controller corresponds to the second smart power stage based on the second control signal.

3. The multi-phase voltage regulator of claim 1, the first smart power stage further comprising:
   a first switch to send the first temperature to the voltage regulator controller based on a rising edge of the first control signal.

4. The multi-phase voltage regulator of claim 3, wherein the first switch is controlled by a mono-stable multi-vibrator.

5. The multi-phase voltage regulator of claim 1, the voltage regulator controller further to:
   determine whether the first temperature of the first smart power stage is equal to or greater than a value of a temperature imbalance threshold; and
   when the first temperature is equal to or greater than the value of the temperature imbalance threshold,
   reduce a first duty cycle of the first phase and adjust each duty cycle of each of the plurality of the other phases according to a temperature balance control policy.

6. The multi-phase voltage regulator of claim 5, wherein the value of the temperature imbalance threshold further includes an average of each temperature of each smart power stage of the plurality of smart power stages.

7. The multi-phase voltage regulator of claim 1, the voltage regulator controller further to:
   determine whether the first temperature of the first smart power stage is equal to or greater than a value of a temperature imbalance threshold; and
   when the first temperature is equal to or greater than the value of the temperature imbalance threshold,
   send a warning that indicates an imminent fault of the first smart power stage.

8. The multi-phase voltage regulator of claim 1, wherein the first control signal is a pulse width modulated signal.

* * * * *